(12) United States Patent
Wu et al.

(10) Patent No.: US 11,132,296 B1
(45) Date of Patent: Sep. 28, 2021

(54) LINEAR INTERPOLATOR OF TABULATED FUNCTIONS

(71) Applicant: Xilinx, Inc., San Jose, CA (US)

(72) Inventors: Ephrem C. Wu, San Mateo, CA (US);
Xiaoqian Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 110 days.

(21) Appl. No.: 16/034,208

(22) Filed: Jul. 12, 2018

(51) Int. Cl.
*G06F 12/00* (2006.01)
*G06F 12/06* (2006.01)

(52) U.S. Cl.
CPC .. *G06F 12/0607* (2013.01); *G06F 2212/1008* (2013.01)

(58) Field of Classification Search
CPC ............ G06F 12/0607; G06F 2212/1008
See application file for complete search history.

(56) References Cited

U.S. PATENT DOCUMENTS

| | | | | |
|---|---|---|---|---|
| 5,173,948 A * | 12/1992 | Blackham | ............... | G06T 15/04 |
| | | | | 348/E5.055 |
| 5,373,457 A * | 12/1994 | George | .................. | G09B 23/00 |
| | | | | 327/334 |
| 6,333,762 B1 * | 12/2001 | Yoo | ....................... | G06T 3/4007 |
| | | | | 348/441 |
| 6,724,822 B1 * | 4/2004 | Bi | ........................ | H04N 7/0125 |
| | | | | 348/E5.112 |
| 9,460,007 B1 | 10/2016 | Wu et al. | | |
| 9,654,755 B2 * | 5/2017 | Wallace | .................... | H04N 9/67 |
| 2004/0003199 A1 * | 1/2004 | May | ....................... | G06F 9/3552 |
| | | | | 711/220 |
| 2005/0237427 A1 * | 10/2005 | Kume | .................. | H04N 7/0135 |
| | | | | 348/443 |
| 2008/0034161 A1 * | 2/2008 | Savell | ................ | H03H 17/0272 |
| | | | | 711/118 |
| 2008/0068396 A1 * | 3/2008 | Ishii | ...................... | G09G 3/3611 |
| | | | | 345/601 |
| 2011/0058686 A1 * | 3/2011 | Toraichi | .................. | G10L 19/04 |
| | | | | 381/98 |

(Continued)

OTHER PUBLICATIONS

Vol. 25, No. 1, Jan. 2017 , Efficient Designs of Multiported Memory on FPGA Bo-Cheng Charles Lai, Member, IEEE, and Jiun-Liang Lin (Year: 2017).*

*Primary Examiner* — David Yi
*Assistant Examiner* — Tahilba O Puche
(74) *Attorney, Agent, or Firm* — Patterson + Sheridan, LLP

(57) ABSTRACT

The embodiments herein store tabulated values representing a linear or non-linear function in separate memory banks to reduce the size of memory used to store the tabulated values while being able to provide upper and lower values for performing linear interpolation in parallel (e.g., the same cycle). To do so, a linear interpolation system includes a first memory bank that stores the even indexed tabulated values while a second memory bank stores the odd indexed tabulated values. During each clock cycle, the first and second memory banks can output upper and lower values for linear interpolation (although which memory bank outputs the upper value and which outputs the lower value can vary). Using the upper and lower values, the linear interpolation system performs linear interpolation to approximate the value of a non-linear function that is between the upper and lower values.

16 Claims, 8 Drawing Sheets

(56) References Cited

U.S. PATENT DOCUMENTS

2014/0149657 A1* 5/2014 Jakovljevic ......... G06F 9/30043
711/109
2015/0206596 A1* 7/2015 Baverstock .......... H04N 19/423
711/110

* cited by examiner

US 11,132,296 B1

LINEAR INTERPOLATOR OF TABULATED FUNCTIONS

TECHNICAL FIELD

Examples of the present disclosure generally relate to a linear interpolator that uses odd/even indexed data stored in separate memory banks.

BACKGROUND

Circuitry to perform non-linear functions is expensive and requires significant area in silicon. Instead of performing non-linear functions, many digital signal processing applications perform linear interpolation to approximate non-linear functions from linear functions. Linear interpolation can be performed using less complicated and smaller logic circuitry (e.g., an arithmetic logic unit (ALU)) thereby reducing the size of the circuitry and the speed at which digital signal processing is performed. For example, a digital processing system may invert a non-linear channel by cancelling the effects introduced by a non-linear filter when transmitting the signal in order to recover the original signal. Stated differently, linear interpolation may be used to implement digital pre-distortion, but can be used in a variety of different digital signal processing systems.

To perform linear interpolation, piecewise tabulated values are stored in memory which include, e.g., discrete points storing values representing the non-linear function. To approximate a value of the non-linear function that is between two of the tabulated values, the linear interpolator identifies and retrieves from the memory an upper value and a lower value from the piecewise tabulated values. Using these values, the linear interpolator interpolates (or approximates) the value of the non-linear function that is somewhere between the upper and lower values. Improving the manner in which the tabulated values are stored in memory can improve the operation of the linear interpolator and reduce the size of memory used to store the tabulated values.

SUMMARY

Techniques for performing linear interpolation are described. One example is a linear interpolation system that includes a two read (2R) memory configured to store piecewise tabulated values representing a function, the 2R memory includes first and second memory units, where the first memory unit is configured to store odd indexed values of the piecewise tabulated values and the second memory unit is configured to store even indexed values of the piecewise tabulated values. The linear interpolation system also includes a linear interpolator configured to receive, during each cycle, a first value from the first memory unit and a second value from the second memory unit and generate an interpolated value by using the first and second values as upper and lower values.

One example described herein is a method that includes outputting, during each cycle, a first value from a first memory unit and a second value from a second memory unit, where the first memory unit stores odd indexed values of piecewise tabulated values for a function and the second memory unit stores even indexed values of the piecewise tabulated values. The method also includes generating an interpolated value by using the first and second values as upper and lower values.

One example described herein is a linear interpolation system that includes a plurality of memories configured to store piecewise tabulated values representing a same function, each of the memories comprising first and second memory units, where the first memory unit is configured to store odd indexed values of the piecewise tabulated values and the second memory unit is configured to store even indexed values of the piecewise tabulated values. The linear interpolation system includes a plurality of linear interpolators, where the plurality of memories and plurality of linear interpolators are grouped to form a plurality of cascaded stages. During each cycle, at least one of the plurality of linear interpolators is configured to receive at least one of a first value from the first memory unit and a second value from the second memory unit and generate an interpolated value by using the at least one first value and second value as one of an upper value and lower value.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
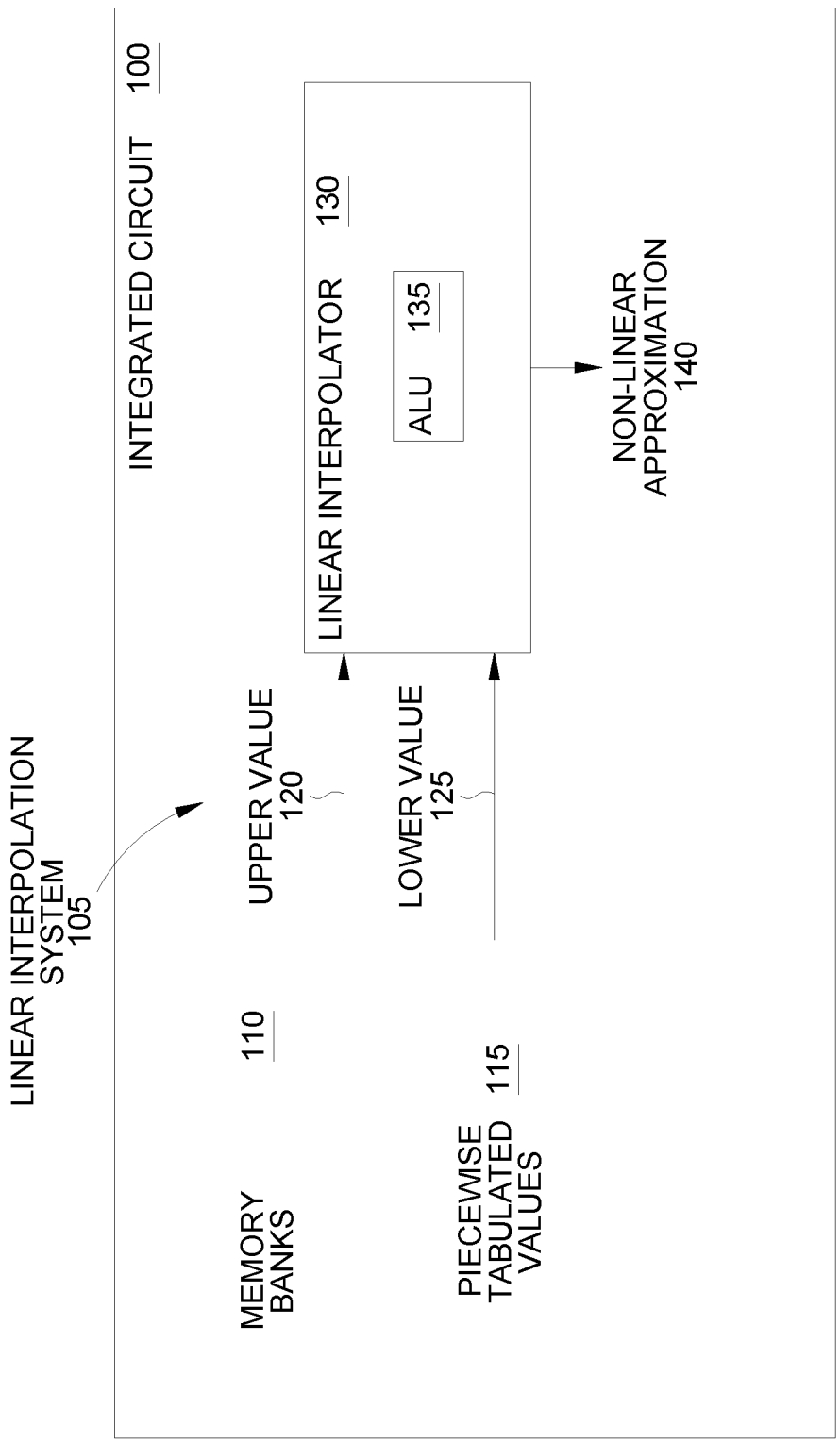
FIG. 1 is a block diagram of a linear interpolation system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein store tabulated values representing a linear or non-linear function in separate memory banks to reduce the size of memory used to store the values while being able to provide upper and lower values for performing linear interpolation in parallel (e.g., the same clock cycle). To do so, a linear interpolation system includes a first memory bank that stores the even indexed tabulated values while a second memory bank stores the odd indexed tabulated values. Doing so avoids storing duplicate data (e.g., duplicate tabulated values) in multiple locations in the same memory bank, thereby reducing memory overhead.

During each clock cycle, the first and second memory banks can output upper and lower values for linear interpolation (although which memory bank outputs the upper value and which outputs the lower value varies). Using the upper and lower values, the linear interpolation system can perform linear interpolation to approximate the value of the non-linear function that is between the upper and lower values. Further, in other embodiments, the tabulated values can extend across memory banks. In that scenario, the linear interpolation system can chain multiple memory banks, or multiple interpolator stages, together. Thus, the embodiments herein can be used when the tabulated values exceed the storage capacity of the memory banks assigned to any one linear interpolator in the system.

FIG. 1 is a block diagram of a linear interpolation system 105, according to an example. FIG. 1 illustrates an integrated circuit 100 that includes circuitry forming the linear interpolation system 105. In one embodiment, the integrated circuit 100 may form an application specific integrated circuit (ASIC), a field programmable gate array (FPGA), a programmable logic device (PLD), and the like. As such, the integrated circuit 100 may include other components rather than what is shown in FIG. 1. In one embodiment, the integrated circuit 100 is part of a digital signal processing system where the linear interpolation system 105 is used to process received digital signals.

The system 105 includes memory banks 110 and a linear interpolator 130. The memory banks 110 store piecewise tabulated values 115 which can be discrete values derived from a linear or a non-linear function. In one embodiment, the tabulated values 115 are spaced a set distance or interval along an x-axis plotting the linear or non-linear function. For example, if the non-linear function is represented by f(x), the tabulated values 115 may store the values of the f(x) when x is 1, 2, 3, 4, 5, etc. However, in other embodiments, the tabulated values 115 may represent values that are not equidistant intervals.

In one embodiment, the tabulated values 115 for the same non-linear function are stored in separate memory banks. As described in more detail below, the odd indexed values of the tabulated values 115 are stored in a first memory bank while the even indexed values are stored in a second memory bank. Doing so avoids data duplication and still permits the memory banks 110 to provide an upper value 120 and a lower value 125 in parallel. Further, although the embodiments herein describe using the piecewise tabulated values to perform linear interpolations, this disclosure is not limited to such. The manner in which the tabulated values 115 are stored in the memory banks 110 (as described in more detail below) may apply to other digital processing techniques.

To perform linear interpolation, the memory banks 110 provide the upper value 120 and the lower value 125 to the linear interpolator 130. The upper value 120 and lower value 125 represent the two tabulated values 115 which are closest to the desired value of the non-linear function. For example, if the desired value is f(5.25), the upper value 120 may be the value of f(6) while the lower value 125 is the value of f(5). The linear interpolator 130 includes an ALU 135 which processes the upper value 120 and lower value 125 to generate a non-linear approximation 140. The non-linear approximation 140 can be used by other digital signal processing systems on the integrated circuit 100 or on other integrated circuits to process a signal (e.g., invert a non-linear channel). In this manner, a plurality of tabulated values 115 can be interpolated to generate approximate values for a non-linear function.

Figure 2:
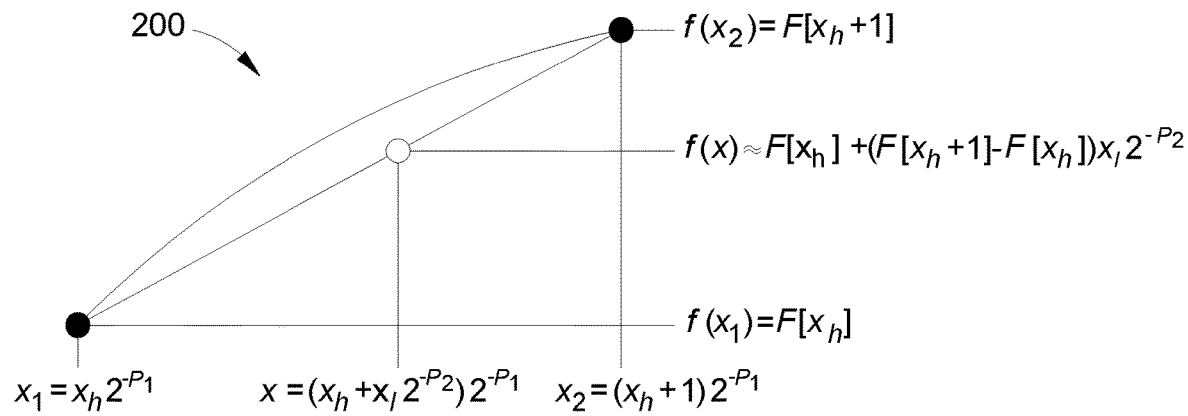
FIG. 2 illustrates performing linear interpolation, according to an example.

FIG. 2 illustrates performing linear interpolation, according to an example. Specifically, FIG. 2 illustrates a chart 200 where linear interpolation between two points (which are located at $x_1$ and $x_2$ on the x-axis) is performed to approximate the value of a non-linear function at x. In one embodiment a linear interpolation function $g(F, x_h, x_l, P_2)$ is used to approximate the non-linear function $f(x)$ where F is an interpolant represented as a length-N array that stores a piecewise linear function $F[i]=f(i)$ where $i \in \{0, 1, \ldots, N-1\}$, $x_h$ is an index to the array F, and $x_l$ is a non-negative integer that represents the interval fraction such that:

$$x=(x_h+x_l 2^{-P_2})2^{-P_1} \text{ for some integer } P_1 \quad (1)$$

The non-linear function f(x) is approximated by the linear interpolation of:

$$g(F,x_h,x_l,P_2)=F[x_h]+(F[x_h+1]-F[x_h])x_l 2^{-P_2} \quad (2)$$

For example, given F[5]=2.5 (e.g., the lower value or bound) and F[6]=3 (e.g., the upper value or bound) by representing x=5.25 as $x=5+2^{-2}$, i.e., $x_h=5$, $x_l=1$, and $P_2=2$, the interpolated result is 2.5+(3-2.5)*0.25=2.625. Thus, by using the stored upper and lower values of the piecewise function, any value of the non-linear function between those values can be approximated. Put differently, the left dot in chart 200 represents a lower value of the tabulated values while the right dot represents the upper value. Using these known values, any value between these two dots values can be approximated using the linear interpolation function shown in Equation 2 above.

The number of tabulated values for the piecewise function is a tradeoff between accuracy and space. While using more tabulated values that are closer together on the x-axis improves accuracy of performing linear interpolation, the linear interpolation system requires more memory to store the tabulated values. To balance cost and throughput, in one embodiment only one memory bank (e.g., a DRAM or SRAM memory bank) is used to store a tabulated function—i.e., the tabulated values representing a particular linear or non-linear function. The memory bank may have two ports: one write port used to initialize and update the table, and a read port for linear interpolation. As shown in FIG. 2, for each linear interpolation evaluation, two adjacent entries of the table is read (i.e., the upper and lower values). This operation uses two reads from the table to retrieve these values. As a result, the linear interpolator outputs a non-linear approximation value every two cycles.

Alternatively, to produce one new result per cycle with only one read port, two entries may be packed together into one address in the memory bank. That is, for every read request, the memory bank returns two values—i.e., both the upper and lower values. This is illustrated in FIGS. 3 and 4.

Figures 3, 4:
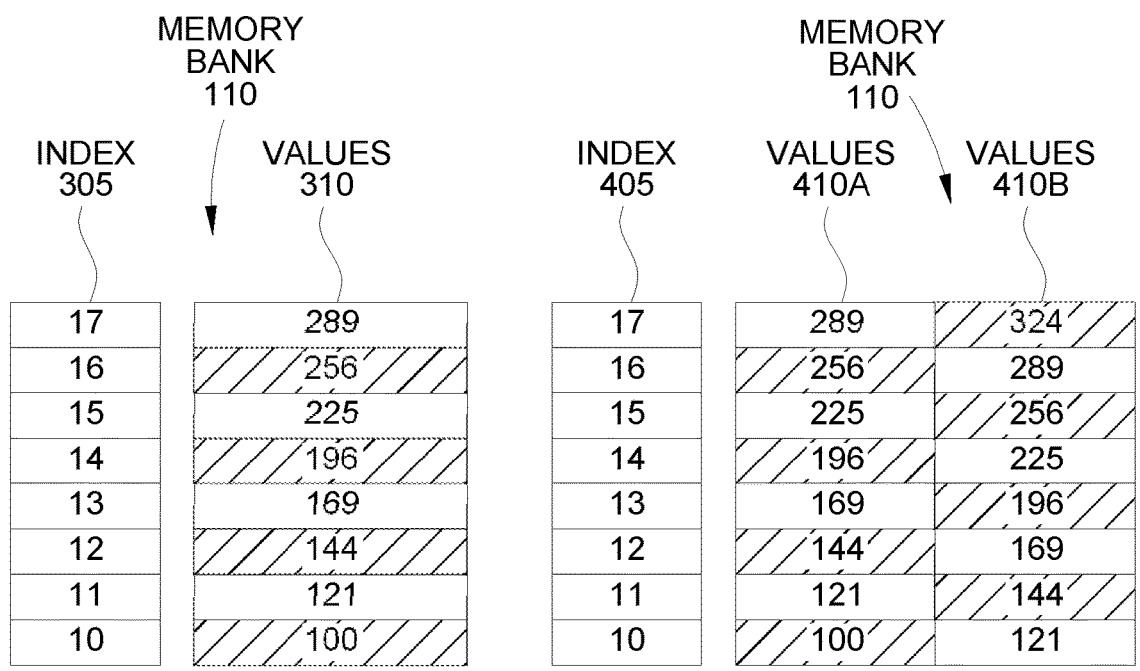
FIG. 3 illustrates a logical view of a piecewise function stored in memory, according to an example.
FIG. 4 illustrates a physical view of a piecewise function stored in a memory bank, according to an example.

FIG. 3 illustrates a logical view of a piecewise function stored in a memory bank 110, according to an example. An index 305 illustrates addresses of the memory bank 110 while values 310 represent the values of the function stored at each address in the index 305. Each index 305 corresponds to one point in the piecewise function (e.g., the left or right dots in the chart 200 in FIG. 2). Using the values 310, the linear interpolator can approximate a value of a non-linear function that is between two of the values 310.

FIG. 4 illustrates a physical view of a piecewise function stored in the memory bank 110, according to an example. While FIG. 3 illustrates a logical view, FIG. 4 illustrates how the values 310 are actually stored in the memory bank 110. As shown, each address in the index 405 corresponds to two of the values 410. Thus, each time the linear interpolator provides a read address, the memory bank 110 returns two values which means the interpolator can perform linear interpolation each cycle using only one memory bank.

However, each value of the piecewise function is stored twice in the memory bank 110. That is, each value is stored once in the column of values 410A and once in the column of values 410B. For example, if the point corresponding to the value "289" is the lower value, the linear interpolator retrieves the values at address "17." However, if the value "289" is the upper value, the linear interpolator retrieves the values at address "16." Because the values of the piecewise function may be both upper and lower values depending on the desired approximate non-linear value, the memory bank 110 stores the values twice as shown in FIG. 4. Doing so consumes twice the amount of storage in order to maintain high throughput (e.g., performing linear interpolation each cycle by reading out two values in parallel from the same memory bank).

Figure 5:
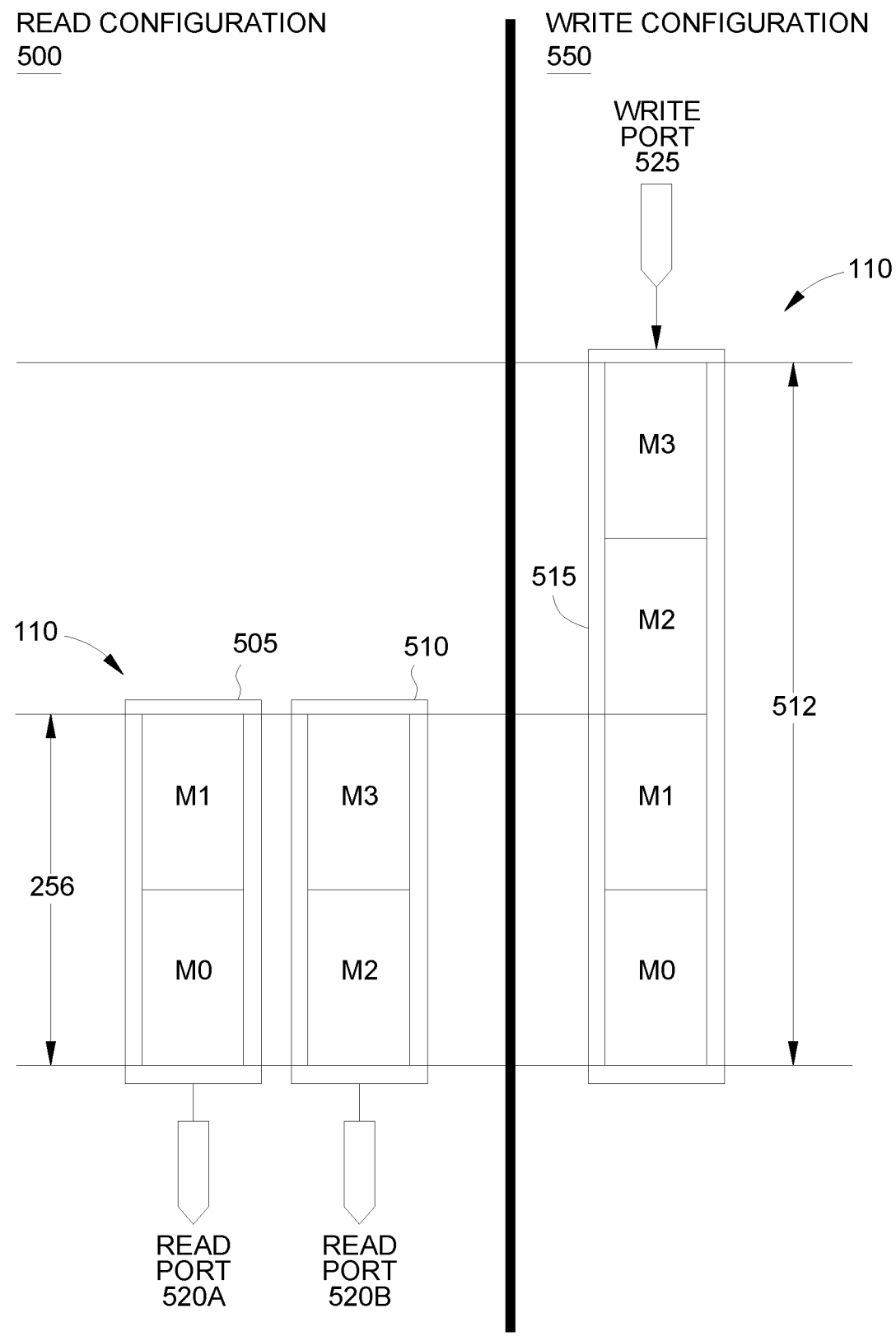
FIG. 5 illustrates read and write configurations of memory banks storing a piecewise function, according to an example.

FIG. 5 illustrates read and write configurations of memory banks storing a piecewise function, according to an example. The read configuration 500 illustrates forming one read one write (1R1W) memory units—e.g., memory units 505 and 510—from four memory banks (i.e., banks M0-M4). Each memory unit 505, 510 includes a respective read port 520 which can output a value each clock cycle. The memory units 505, 510 are arranged in parallel such that during each clock cycle, each unit 505, 510 can output a value via the read ports 520 to the linear interpolator (not shown).

In this example, the values of the piecewise function (i.e., the tabulated values) are stored in the two memory units 505 and 510. That is, instead of storing all the tabulated values in the same memory bank, the values are distributed across multiple memory banks M0-M4 in the memory units 505 and 510. For example, half of the values can be stored in the memory unit 505 while the remaining half are stored in the unit 510. Although the memory units 505, 510 are shown as storing 256 entries (for a total of 512 tabulated values of the piecewise function), the units may include any number of entries.

The write configuration 550 illustrates that the memory banks M0-M4 share a common write port 525. That is, when writing to the memory banks, the banks are organized in a memory unit 515 that forms a single memory unit sharing the same write port 525. As explained above, the write port 525 can be used to update the tabulated values stored in the memory banks M0-M4. In this manner, the four memory banks can be arranged into a two read one write (2R1W) memory using the logical read configuration 500 and the logical write configuration 550.

Figure 6:
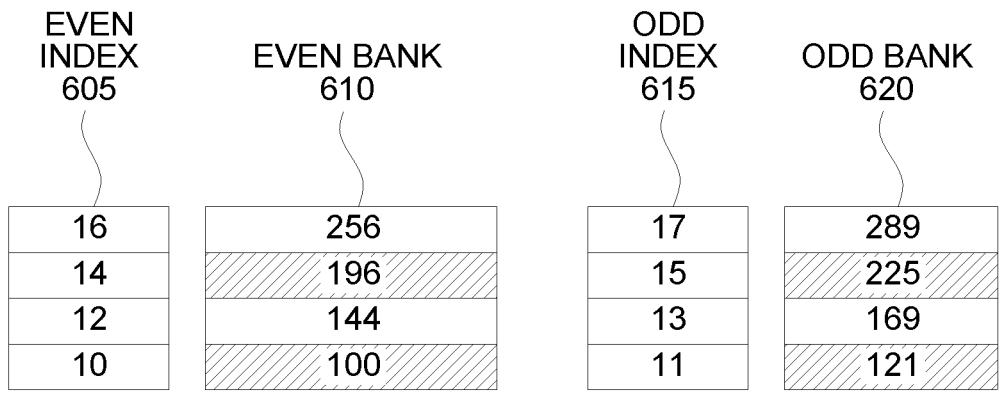
FIG. 6 illustrates a physical view of a piecewise function stored in multiple memory banks, according to an example.

FIG. 6 illustrates a physical view of a piecewise function stored in multiple memory banks, according to an example. The logical view of the tabulated values shown in FIG. 6 is the same as what is shown in the logical view of FIG. 3. That is, the tabulated values are the same in both figures with the same index; however, instead of storing two values at each address as shown in FIG. 4, FIG. 6 illustrates stores the values corresponding to the even addresses in an even bank 610 and the values corresponding to the odd address in the odd bank 620. Put differently, the value corresponding to an even index 605 are stored in a different memory than the values corresponding to an odd index 615.

In one embodiment, the even bank 610 is the memory unit 505 while the odd bank 620 is the memory unit 510. As such, the even bank 610 and the odd bank 620 each have their own read port 520 so that one of the values in the even bank 610 and one of the values in the odd bank 620 can be outputted each clock cycle. As described below, the ALU in the linear interpolator can include logic for performing linear interpolation using the value read from the even bank 610 and the value read from the odd bank 620. In this manner, the memory banks 610 and 620 can form a 2R1W memory, but they could also form a 2R2W memory.

Figure 7:
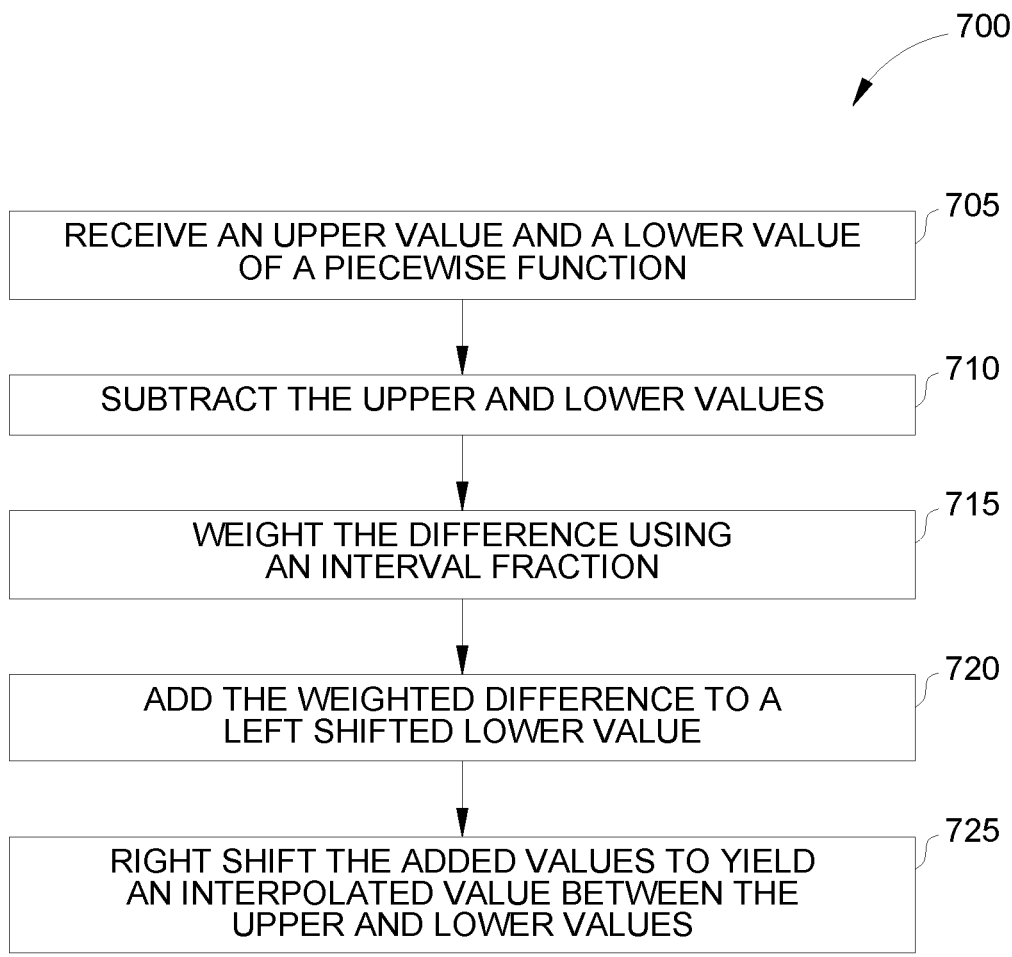
FIG. 7 is a flowchart for performing linear interpolation, according to an example.
Figure 8:
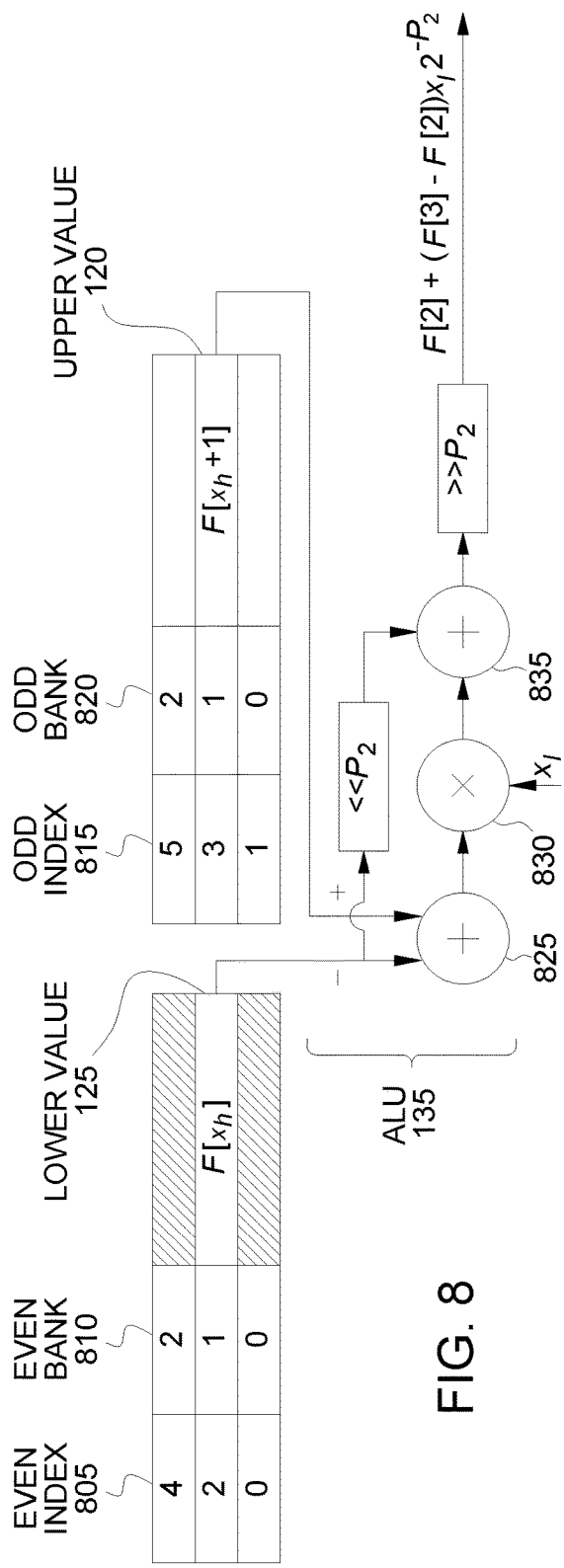
FIG. 8 illustrates logic circuitry for performing linear interpolation on tabulated values stored in even and odd memories, according to an example.
Figure 9:
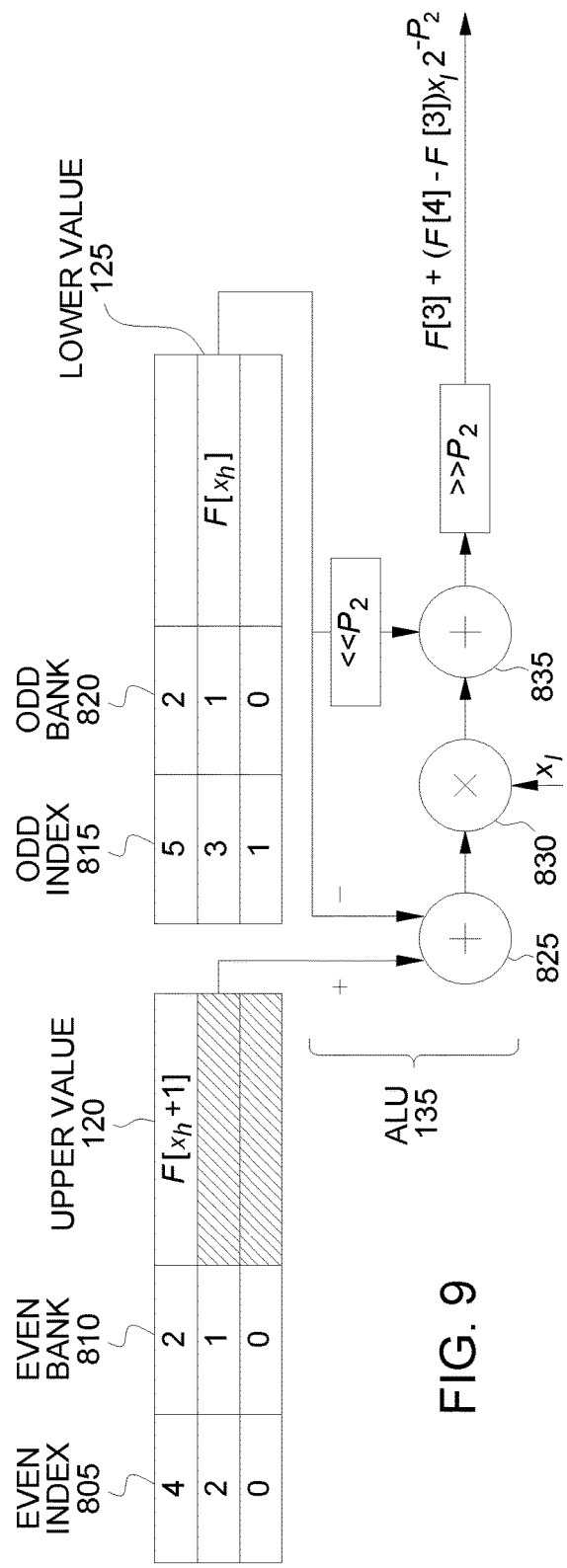
FIG. 9 illustrates logic circuitry for performing linear interpolation on tabulated values stored in even and odd memories, according to an example.

FIG. 7 is a flowchart of a method 700 for performing linear interpolation, according to an example. For clarity, the blocks in the method 700 are discussed in parallel with FIGS. 8 and 9 which illustrate logic circuitry for performing linear interpolation on the stored tabulated values illustrated in FIG. 6. Specifically, FIGS. 8 and 9 illustrate logic circuitry in the ALU 135 for performing linear interpolation using upper and lower values 120, 125 retrieved from an even bank 810 and an odd bank 620.

At block 705, the ALU 135 in the linear interpolator receives the upper value 120 and the lower value 125 of a piecewise function from the even bank 810 and the odd bank 820. That is, in one embodiment, the linear interpolator receives one value from the even bank 810 and one value from the odd bank 820 each clock cycle. However, in some instances, the upper value 120 is stored in the odd bank 820 while the lower value 125 is retrieved from the even bank 810 (as is the case in FIG. 8) but in other instances the upper value 120 is retrieved from the even bank 810 while the lower value 125 is retrieved from the odd bank 820 (as is the case in FIG. 9). For example, in the example shown in FIG. 8, the desired approximated value is between F[3] and F[2]. As such, the value stored in the odd bank 820 is the upper value 120 while the value retrieved from the even bank 810 is the lower value 125. In contrast, the desired approximate value in FIG. 9 is between F[4] and F[3], and as such, the even bank 810 stores the upper value 120 while the odd bank 820 stores the lower value 125.

Returning to the method 700, at block 710, the ALU 135 subtracts the upper and lower values. As shown in FIGS. 8 and 9, a subtractor 825 subtracts the upper value 120 from the lower value 125. This difference is then forwarded to a multiplier 830.

At block 715, the ALU weights the difference between the upper and lower values using the interval fraction $x_f$—e.g., a non-negative integer and represents the number of bits to the right of the binary point. As shown in FIGS. 8 and 9, the multiplier 830 multiplies the difference provided by the subtractor 825 to the interval fraction which is then outputted to an adder 835.

In one embodiment, the linear interpolation formula expressed in Equation 2 above is mapped to the ALU 135 as:

$$g(F, x_h, x_l, P_2) = (F[x_h])2^{P_2} + (F[x_h+1] - F[x_h])x_l 2^{-P_2} \qquad (3)$$

As a result, in this example, an arithmetic left shift by the amount $P_2$ is performed for $F[x_h]$ and the pre-add-multiple-post-add output is arithmetically right shifted by $P_2$. This is shown by the two bit shifters in FIGS. 8 and 9. Because $P_2$ is the number of bits of the interval fraction $x_1$ and the interval fraction $x_1$ only feeds the multiplier 830, $P_2$ may be limited by the port width of the multiplier 830. Thus, in one embodiment, $P_2$ can be a constant since a constant shift reduces the cost of the arithmetic bit shifters in the ALU 135.

At block 720, the ALU 135 adds the weighted difference to a left shifted lower value. That is, the adder 835 adds the output of the multiplier 830 to the lower value 125 after the lower value 125 has been left shifted by $P_2$. In one embodiment, $P_2$ represents the number of bits in the desired approximated value that are to the right of the binary point. Using decimal numbers as an example, if the desired value was f(5.25), the interval fraction $x_I$ is 0.25 and $P_2$ is two.

At block 725, the ALU 135 right shifts the added values to yield an interpolated value between the upper and lower values. That is, after performing the right shift by $P_2$, the ALU has performed the operation in Equation 3 to output the interpolated value that is between the upper and lower values 120, 125.

One advantage of the method 700 and organizing the tabulated values in odd and even banks as illustrated in FIGS. 6, 8, and 9 is that the ALU can receive the upper and lower values from memory each clock cycle without packing two values into each address of the index. As such, each tabulated value is stored once in memory thereby reducing the size of the memory by half while still maintaining high throughput. Put differently, the memory is arranged to form a 2R1W memory from two 1R1W memory units (i.e., the odd and even banks) which store either the odd index values of the even index values.

Figure 10:
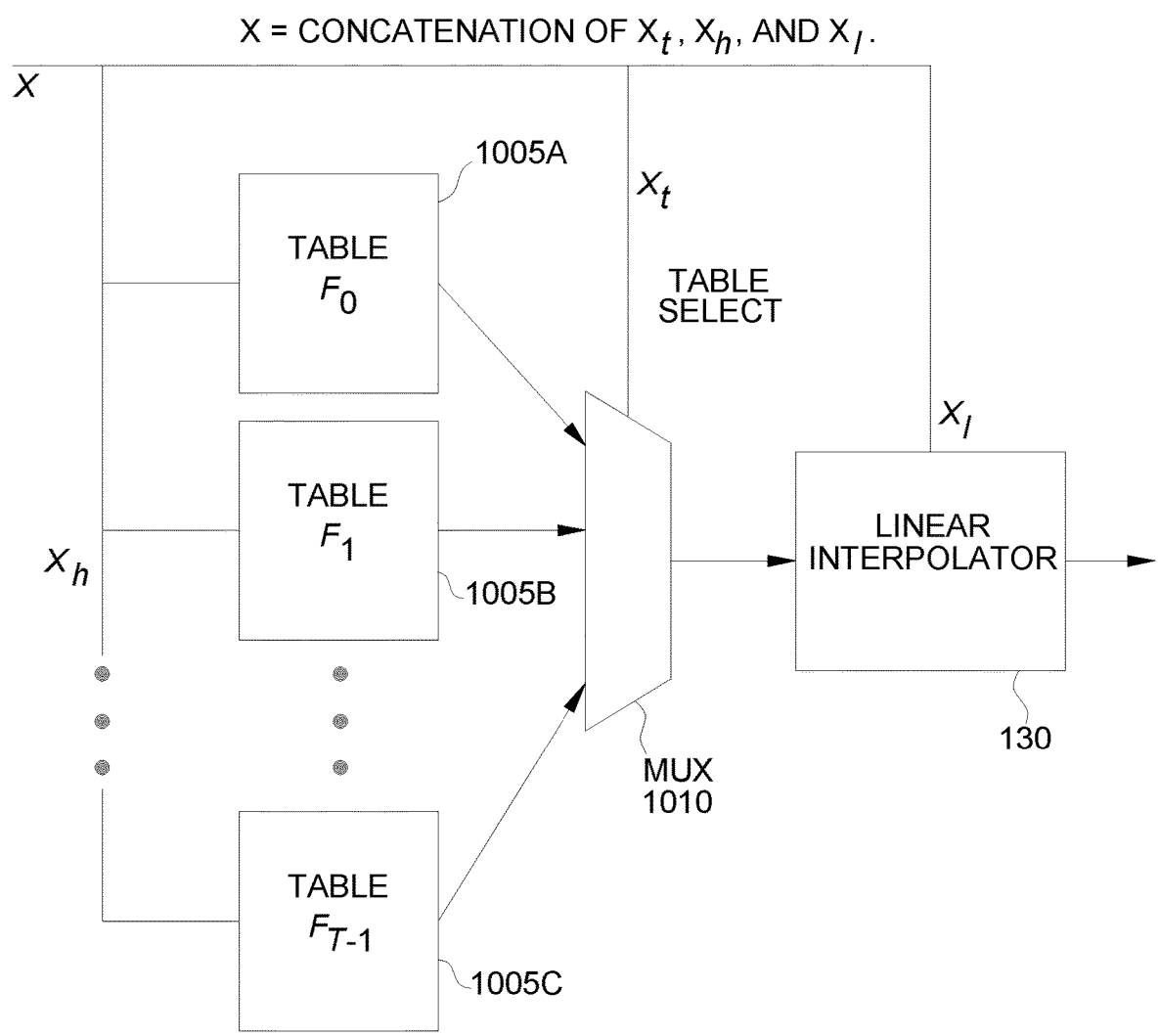
FIG. 10 illustrates logic circuitry for using a piecewise non-linear function stored in multiple tables, according to an example.

FIG. 10 illustrates logic circuitry for using a piecewise function stored in multiple tables, according to an example. In one embodiment, the memory banks for a linear interpolator may not be sufficient for storing all the tabulated values in a function. For example, the memory banks M0-M4 in FIG. 5 can store only 512 tabulated values. However, some linear interpolation operations may have functions with more than 512 tabulated values.

In one embodiment, the integrated circuit includes multiple linear interpolators which each have their own memory banks—e.g., each linear interpolator has memory banks M0-M4. These memory banks can be shared to store the values for a large tabulated function while one of the ALUs in the linear interpolator is selected to perform the linear interpolation. To do so, the linear interpolation system 1000 includes multiple tables which are stored in respective memories 1005. For example, the memory 1005A may include memory banks that are assigned to a first linear interpolator, the memory 1005B may include memory banks assigned to a second linear interpolator, and so forth. When the tabulated values of a function are small enough to fit in one of the memories 1005, then each linear interpolator can function independently to perform linear interpolation using different tabulated functions. However, when the function includes more values than can be stored in any one of the memories 1005, the values can be divided into tables and stored across the memories 1005 as shown in FIG. 10. For example, the table $F_0$ stored in memory 1005A may contain the tabulated values for addresses 0-511, the table $F_1$ stored in memory 1005B may contain the tabulated values for addresses 512-1023, and so forth.

Moreover, each of the memories 1005 may have a physical view as shown in FIG. 6 where the values of the even index 605 are stored in the even bank 610 and the values of the odd index 615 are stored in the odd bank 620. For example, the even values of the 0-511 addresses (i.e., 0, 2, 4, 6, . . . , 510) are stored in a first memory unit in the memory 1005A while the odd values of the 0-511 addresses (i.e., 1, 3, 5, . . . , 511) are stored in a second memory unit in the memory 1005A. For clarity, the memories 1005 are shown as singular memories in FIG. 10 although that can have odd and even banks.

The input x provided to the linear interpolation system 1000 can be represented as:

$$x=(x_t D + x_h + x_I 2^{-P_2})2^{-P_1} \text{ where } x_t \in \{0,1,\ldots,T-1\} \quad (4)$$

In Equation 4, T is the number of smaller tables formed out of the local memory banks in each of the memories 1005 and D is an even number and is the number of tabulated values the local memory banks can store. As such, the Table F can be decomposed into T smaller tables shown as $F_0$, $F_1$, . . . , $F_{T-1}$ in FIG. 10. In one embodiment, D is a power of two so that the higher order bits of x is the table-select index $x_t$.

As shown, the value $x_h$ (which represents the highest order bits in the input value x) is used to select upper and lower values from each of the memories 1005 (assuming the upper and lower values do not span across an edge between memories 1005). These values are then transmitted to a multiplexer (MUX) 1010. That is, the same address (represented by $x_h$) is transmitted to each of the memories 1005. The table-select index $x_t$ is used as a selector signal to select one of the upper and lower values retrieved from the memories 1005. The selected values are then transmitted to the linear interpolator 130 along with the interval fraction $x_1$. The linear interpolator 130 can function as described in the method 700 above.

There are three cases to consider when computing the interpolation function across multiple tables. The first case is when the local-table index is not at an edge between tables or memories 1005. This occurs when $x_h$, is less than D−1. In that case, the interpolated value is:

$$(F_t[x_h]2^{P_2} + (F_t[x_h+1] - F_t[x_h])x_I)2^{-P_2} \quad (5)$$

In this case, the upper and lower values are retrieved from the same memory 1005.

In the second case, the local-table index is at the edge between two tables of memories 1005 where $x_h$, equals D−1 and t is less than T−1 (i.e., not the last table). The interpolated value in this case is:

$$(F_t[D-1]2^{P_2}(F_{t+1}[0] - F_t[D-1])x_I)2^{-P_2} \quad (6)$$

Because each table (and memory 1005) may be coupled to its own ALU, the computation can be distributed over two ALUs as:

$$(F_t[D-1]2^{P_2} + x_I F_{t+1}[0] - x_I F_t[D-1])2^{-P_2} \quad (7)$$

Where the ALU corresponding to the "t" memory 1005 computes:

$$y_t = F_t[D-1]2^{-P_2} - x_I F_t[D-1] \quad (8)$$

And the ALU corresponding to the "t+1" memory 1005 computes:

$$f(x) \approx (y_t + x_I F_{t+1}[0])2^{-P_2} \quad (9)$$

Where $y_t$ is provided by the upstream ALU corresponding to the "t" memory. Note that the ALU for the "t" memory 1005 may access only the table F t (and not $F_{t+1}$) and the ALU for the "t+1" memory 1005 may access only the table $F_{t+1}$ (and not $F_t$). This decomposition ensure maximizes locality where the output $y_t$ is passed from the output of the ALU for the t memory to the post-adder input of the ALU for the "t+1" memory.

In the third case, the local-table index is at the edge of the very last table where $x_h$, equals D−1 and t equals T−1. In this situation, the linear interpolator value may be saturated and the interpolated value is set to the last entry in the last table—e.g., $F_{T-1}[D-1]$.

Figure 11:
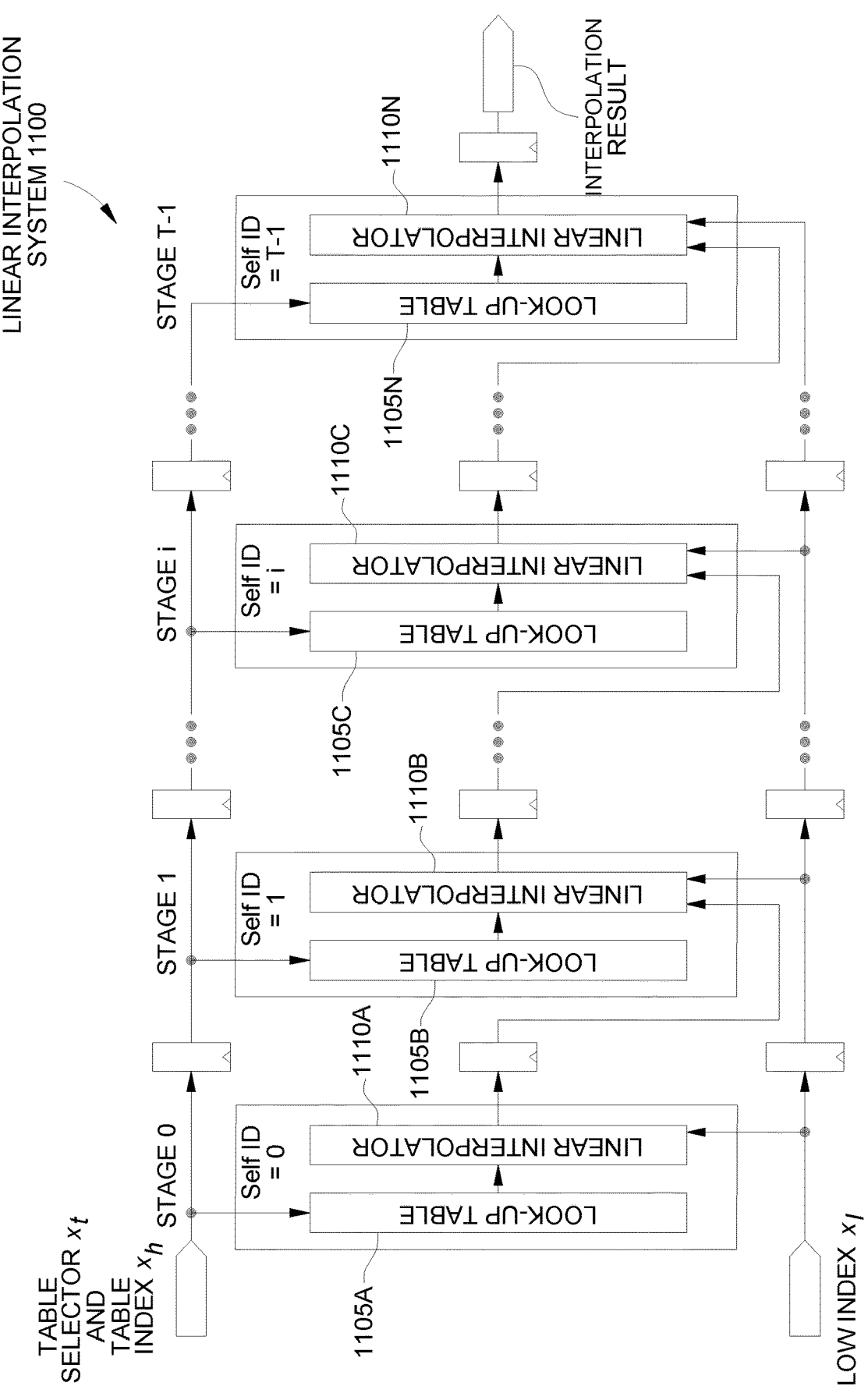
FIG. 11 illustrates logic circuitry forming a chain of linear interpolators, according to an example.

FIG. 11 illustrates logic circuitry forming a chain of linear interpolators, according to an example. That is, the linear interpolation system 1100 includes a plurality of stages each including a look-up table 1105 (e.g., one of the memories 1005 illustrated in FIG. 10) and a linear interpolator 1110. FIG. 11 illustrates one example of circuitry for performing the functions illustrated in FIG. 10. As such, each look-up table 1105 may store one of the tables $F_0, F_1, \ldots, F_{T-1}$ illustrated in FIG. 10.

In system 1100, each of the stages has its own self ID. When the self-ID does not match the table selector $x_t$, the stage passes the values received from the previous stage (if any) to the next stage. When the self ID for a stage matches the table selector $x_t$, the read-enable of the corresponding local look-up table 1105 is asserted. In other words, the look-up table 1105 for that stage is actively being used for interpolation. For the second and third cases described above, only one value, namely $F_t [D-1]$ is read from the look-up table 1105, specifically the odd bank. For the second case, the ALU in the linear interpolator 1110 is used as a multiply-accumulator (MAC) to compute $y_t$ as shown in Equation 8 which is then passed on to the ALU in the next stage (t+1) in the cascade of stages. For the third case, the ALU in the last stage (e.g., stage T−1) passes the memory value directly to the output since the system 1100 has saturated.

When the self ID matches $x_{t+1}$ and the second case applies, the read-enable of the corresponding look-up table 1105 is asserted and $F_{t+1}[0]$ is read. The ALU sums $x_l F_{t+1}[0]$ and $y_t$ from the ALU of stage t and right-shifts the result.

In another embodiment, $y_t$ can be alternatively computed using the following equation:

$$y_t = F_t[D-1](2^{-P_2} - x_l) \qquad (10)$$

In this case, the pre-adder in the ALU (e.g., the subtractor 825 in FIG. 8) is used to compute $2^{-P_2} - x_l$.

In another embodiment, for the third case where the linear interpolator is saturated, the linear interpolator 1110 in the last stage can multiple the value $F_{T-1}[D-1]$ by 1 and add 0 to this value as a special MAC operation to output a saturated value rather than having a special by-pass path as discussed above. In other embodiments, a special symbol can be defined as the returned value, which may be different from the last entry of the last table. For instance, an infinity symbol or a not-a-number symbol could be provided as a saturated value to indicate that the index is out-of-bound.

The throughput of the linear interpolation system 1100 in FIG. 11 may have the same throughput as the single linear interpolator shown in FIGS. 8 and 9. Although there is some delay as the values propagate through the cascade in FIG. 11, the system 1100 can nonetheless output an interpolation result each clock cycle similar to the single linear interpolator shown in FIGS. 8 and 9.

Figure 12:
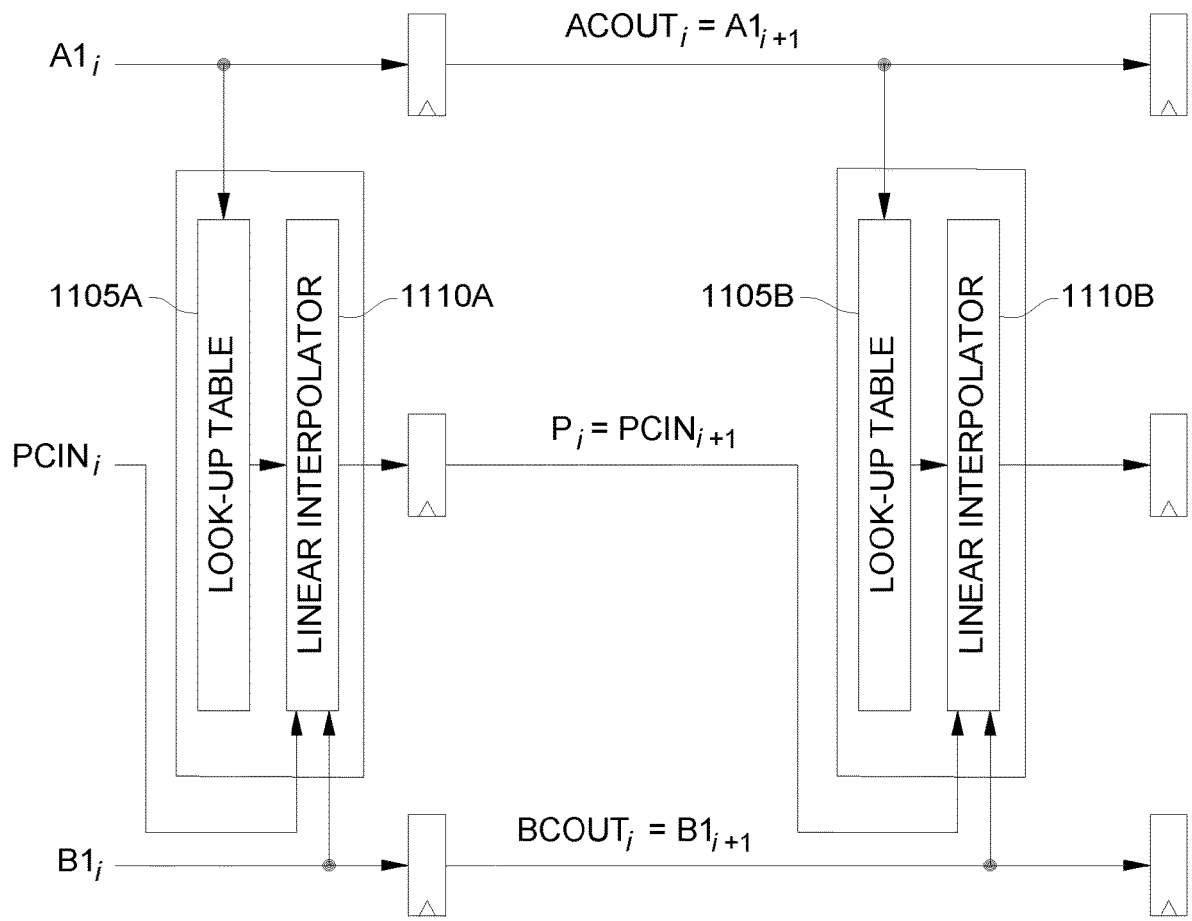
FIGS. 12 and 13 illustrate detailed views of circuitry in FIG. 11, according to an example.
Figure 13:
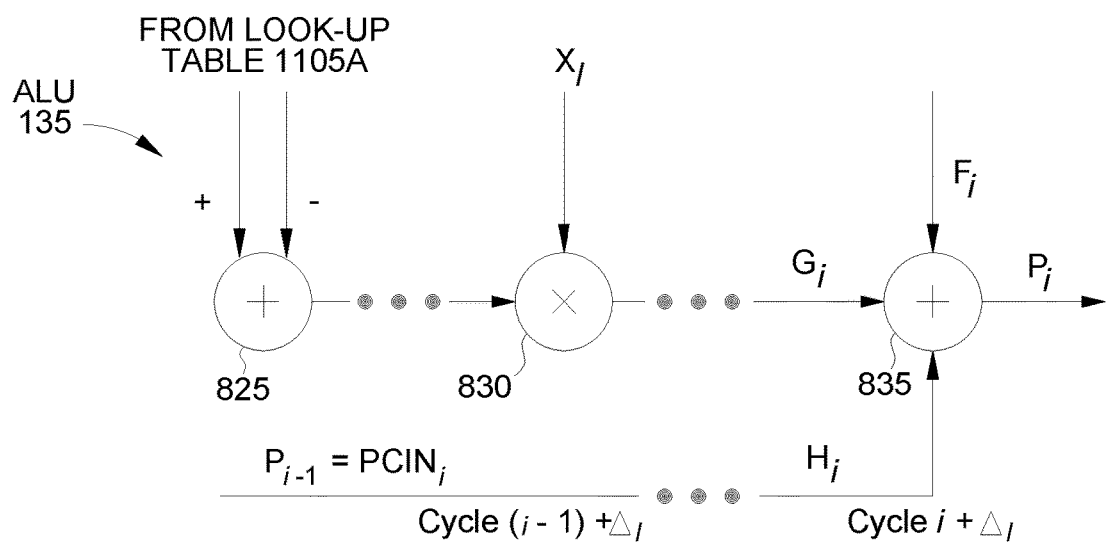

FIGS. 12 and 13 illustrate detailed views of circuitry in FIG. 11, according to an example. Specifically, FIG. 12 illustrates the signals transmitted between stage 0 which includes the look-up table 1105A and the linear interpolator 1110A and stage 1 which includes the look-up table 1105B and the linear interpolator 1110B. The $A1_t$ signal corresponds to the table selector $x_t$ and the table index $x_1$, while the $B1_t$ signal corresponds to the low index $x_1$. FIG. 12 also illustrates the signal $PCIN_i$ which is a signal that can be received from an upstream stage in the cascade. As mentioned above, the linear interpolators 1110 can either pass the value of $PCIN_i$ on to the next stage (if their self ID isn't matched) or generate their own data which is passed to the next stage depending on whether it is the first case or the second case.

FIG. 13 illustrates an ALU 135 that may be disposed in each of the linear interpolators 1110 (e.g., the linear interpolator 1110A) in FIGS. 11 and 12. The ALU 135 has the subtractor 825, multiplier 830, and the adder 835 which were described previously. FIG. 13 illustrates that the $PCIN_i$ signal is received at the adder 835 in the ALU 135 which then determines whether the signal is changed (if the self ID for the linear interpolator is matched) or is passed through unchanged to the next stage (if the self ID is not matched).

In one example, the embodiments above can be used to store multiple tabulated functions (referred to as multi-context tables) in the same table (e.g., the same memory) for a linear interpolator. That is, different tables for different functions can be stored in the memory corresponding to either one linear interpolator or a chain of interpolators as shown in FIG. 11. Multi-context tables are used for systems that synchronize switch-over to a new look-up table (for instance, in response to environmental changes in a wireless system). The hardware can be ambivalent to storing multi-context tables since the context can be specified in the input and the hardware in the linear interpolator treats the input as a memory address. In this manner, the linear interpolator can switch between the tables instantaneously without waiting for one table to be evicted while another table is loaded into the memory of the linear interpolator.

Further, the embodiments herein can be used to perform linear interpolation that includes real and imaginary values—e.g., a interpolated value that includes a real part and an imaginary part. In this example, the linear interpolator could include two ALUs: one for receiving the upper and lower values of the real part and another for receiving the upper and lower values of the imaginary part. The two ALUs could operate in parallel to achieve high throughput—i.e., an interpolated value could be outputted every cycle.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A linear interpolation system, comprising:
a two read (2R) memory configured to store piecewise tabulated values derived from a function, the 2R memory comprising first and second memory units, wherein the first memory unit is configured to store odd indexed values of the piecewise tabulated values and the second memory unit is configured to store even indexed values of the piecewise tabulated values; and
a linear interpolator configured to:
receive in parallel a first value from the first memory unit and a second value from the second memory unit, and
generate an interpolated value by using the first and second values as upper and lower values;
wherein the linear interpolator comprises:
a subtractor configured to subtract the upper value from the lower value;
a multiplier configured to multiply an output of the subtractor to an interval fraction $x_1$; and
an adder configured to add an output of the multiplier to a bit shifted version of the lower value.

2. The linear interpolation system of claim 1, wherein the 2R memory is a 2R one write (2R1 W) memory comprising two read ports for outputting the first value and second values every clock cycle and one write port for updating the piecewise tabulated values stored in the 2R1 W memory.

3. The linear interpolation system of claim 1, wherein the linear interpolator comprises an arithmetic logic unit (ALU), the ALU comprising the subtractor, the multiplier, and the adder.

4. The linear interpolation system of claim 1, wherein the lower value is bit shifted by a constant shift during each clock cycle.

5. The linear interpolation system of claim 1, wherein the linear interpolator is configured to bit shift the output of the adder to generate the interpolated value.

6. A method of performing linear interpolation, the method comprising:
outputting in parallel a first value from a first memory unit to and a second value from a second memory unit, wherein the first memory unit stores odd indexed values of piecewise tabulated values derived from a function and the second memory unit stores even indexed values of the piecewise tabulated values, the tabulated values spaced a set distance apart along an x-axis plotting the function; and
generating an interpolated value by using the first and second values as upper and lower values by:
subtracting the upper value from the lower value to generate a first output;
multiplying the first output to an interval fraction $x_l$ to generate a second output; and
adding the second output to a bit shifted version of the lower value to generate a third output.

7. The method of claim 6, wherein the first memory unit and the second memory unit are part of a 2R1 W memory comprising two read ports for outputting the first value and second values every clock cycle and one write port for updating the piecewise tabulated values stored in the 2R1 W memory.

8. The method of claim 6, wherein the lower value is bit shifted by a constant shift during each clock cycle.

9. The method of claim 6, wherein generating the interpolated value comprises: bit shifting the third output to generate the interpolated value.

10. A linear interpolation system, comprising:
a plurality of memories configured to store piecewise tabulated values derived from a same function, each of the memories comprising first and second memory units, wherein the first memory unit is configured to store odd indexed values of the piecewise tabulated values and the second memory unit is configured to store even indexed values of the piecewise tabulated values; and
a plurality of linear interpolators, wherein the plurality of memories and plurality of linear interpolators are grouped to form a plurality of cascaded stages, wherein at least one of the plurality of linear interpolators is configured to:
receive in parallel at least one of a first value from the first memory unit and a second value from the second memory unit, and
generate an interpolated value by using the at least one first value and second value as one of an upper value and lower value;
wherein the at least one of the linear interpolators comprises:
a subtractor configured to subtract the upper value from the lower value;
a multiplier configured to multiply an output of the subtractor to an interval fraction $x_1$; and
an adder configured to add an output of the multiplier to a bit shifted version of the lower value.

11. The linear interpolation system of claim 10, wherein, except for a last stage in the plurality of cascaded stages, an output of each of the plurality of linear interpolators is coupled to an input of a linear interpolator in a subsequent stage.

12. The linear interpolation system of claim 10, wherein, during each clock cycle, each of the plurality of linear interpolators is configured to determine whether a self ID matches a table selector $x_t$ in order to activate a corresponding one of the plurality of memories.

13. The linear interpolation system of claim 12, wherein, when a self ID matches the table selector $x_t$, the corresponding one of the plurality of memories is used to output one of the upper and lower values.

14. The linear interpolation system of claim 10, wherein the plurality of cascaded stages is configured such that, when a local-table index is not at an edge between tables stored in separate memories of the plurality of memories, the upper and lower values are retrieved from a same memory of the plurality of memories.

15. The linear interpolation system of claim 14, wherein the plurality of cascaded stages is configured such that, when the local-table index is at an edge between two of the tables, the upper value is provided by a first memory of the plurality of memories and the lower value is provided by a second memory of the plurality of memories.

16. The linear interpolation system of claim 14, wherein the plurality of cascaded stages is configured such that, when the local-table index is at an edge of a last table of the tables, the linear interpolator in a last stage of the plurality of cascaded stages outputs a saturated value as the interpolated value.

* * * * *

UNITED STATES PATENT AND TRADEMARK OFFICE
CERTIFICATE OF CORRECTION

PATENT NO. : 11,132,296 B1
APPLICATION NO. : 16/034208
DATED : September 28, 2021
INVENTOR(S) : Wu et al.

Page 1 of 1

It is certified that error appears in the above-identified patent and that said Letters Patent is hereby corrected as shown below:

In the Specification

Column 5, Line 25, Delete "4108" and insert -- 410B --, therefor.

Column 6, Line 67, Delete "$x_l2$" and insert -- $x_1)2$ --, therefor.

Column 10, Line 1, Delete "$x_1$," and insert -- $x_h$ --, therefor.

In the Claims

Column 11, Line 25, In Claim 2, delete "2R1 W" and insert -- 2R1W --, therefor.

Column 11, Line 28, In Claim 2, delete "2R1 W" and insert -- 2R1W --, therefor.

Column 11, Line 41-42, In Claim 6, delete "unit to" and insert -- unit --, therefor.

Column 11, Line 58, In Claim 7, delete "2R1 W" and insert -- 2R1W --, therefor.

Column 11, Line 61, In Claim 7, delete "2R1 W" and insert -- 2R1W --, therefor.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*